US010205567B2

United States Patent
Berggren et al.

(10) Patent No.: US 10,205,567 B2
(45) Date of Patent: Feb. 12, 2019

(54) METHODS AND NODES IN A WIRELESS COMMUNICATION SYSTEM

(71) Applicant: HUAWEI TECHNOLOGIES CO., LTD., Shenzhen (CN)

(72) Inventors: Fredrik Berggren, Kista (SE); Weijun Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/731,035

(22) Filed: Jun. 4, 2015

(65) Prior Publication Data
US 2015/0280872 A1 Oct. 1, 2015

Related U.S. Application Data

(63) Continuation of application No. PCT/EP2012/074531, filed on Dec. 5, 2012.

(51) Int. Cl.
*H04L 5/00* (2006.01)
*H04W 72/00* (2009.01)

(52) U.S. Cl.
CPC ............ *H04L 5/0023* (2013.01); *H04L 5/005* (2013.01); *H04W 72/005* (2013.01)

(58) Field of Classification Search
CPC ..... H04L 5/0023; H04L 5/005; H04W 72/005
See application file for complete search history.

(56) References Cited

U.S. PATENT DOCUMENTS

| 2007/0140106 | A1* | 6/2007 | Tsai | H04B 7/2681 370/208 |
| 2011/0293037 | A1* | 12/2011 | Liu | H04L 5/001 375/295 |
| 2012/0182956 | A1 | 7/2012 | Liu et al. | |
| 2013/0094411 | A1* | 4/2013 | Zhang | H04W 72/04 370/281 |

(Continued)

FOREIGN PATENT DOCUMENTS

| CN | 101883369 | 11/2010 |
| WO | WO 2013/000509 A1 * | 3/2013 |

OTHER PUBLICATIONS

International Search Report dated Sep. 9, 2013 in corresponding international application PCT/EP2012/074531.
(Continued)

*Primary Examiner* — Shailendra Kumar
(74) *Attorney, Agent, or Firm* — Staas & Halsey LLP

(57) ABSTRACT

Methods (700, 900) and nodes (110, 120) for transmission of broadcast information, over at least one antenna port, in a subframe, which transmission is received by a receiver (110) in a wireless communication system (100). The broadcast information is transmitted over a set of antenna ports comprising at least one antenna port, in at least one subframe (300) comprising a set of time-frequency resources, wherein a cell-specific reference signal, CRS, is not transmitted in each subframe (300). The method (700) comprises defining (701) a set of antenna ports for the set of time-frequency resources. Also, the method (700) comprises transmitting (702) the broadcast information on the defined (701) set of antenna ports, thereby using said set of time-frequency resources exclusively, such that they are unused for any other antenna port.

19 Claims, 11 Drawing Sheets

(56) References Cited

U.S. PATENT DOCUMENTS

2014/0301238 A1* 10/2014 Chun .................... H04L 5/0048
370/252
2015/0237602 A1* 8/2015 Chae ........................ H04B 7/08
370/329

OTHER PUBLICATIONS

PCT International Search Report dated Sep. 9, 2013 in corresponding International Patent Application No. PCT/EP2012/074531.
"3$^{rd}$ Generation Partnership Project; Technical Specification Group Radio Access Network; Evolved Universal Terrestrial Radio Access (E-UTRA); Physical Channels and Modulation (Release 11)", 3GPP TS 36.211, V11.0.0, Sep. 2012, pp. 1-106.
Chinese Office Action dated Mar. 9, 2017 in Chinese Patent Application No. 201280077339.0.

* cited by examiner

METHODS AND NODES IN A WIRELESS COMMUNICATION SYSTEM

CROSS REFERENCE

This application is a continuation of International Application No. PCT/EP2012/074531, filed on Dec. 5, 2012, which is incorporated herein by references in its entirety.

FIELD OF INVENTION

Implementations described herein relate generally to a radio network node, a method in a radio network node, a receiver and a method in a receiver. In particular is herein described a mechanism for transmission of broadcast information, from the radio network node to the receiver, using a set of time-frequency resources exclusively associated with a set of antenna ports for transmission of information.

BACKGROUND OF INVENTION

A receiver, also known as User Equipment (UE), mobile station, wireless terminal and/or mobile terminal is enabled to communicate wirelessly in a wireless communication system, sometimes also referred to as a cellular radio system. The communication may be made, e.g., between two receivers, between a receiver and a wire connected telephone and/or between a receiver and a server via a Radio Access Network (RAN) and possibly one or more core networks.

The receiver may further be referred to as mobile telephones, cellular telephones, computer tablets or laptops with wireless capability. The UEs in the present context may be, for example, portable, pocket-storable, hand-held, computer-comprised, or vehicle-mounted mobile devices, enabled to communicate voice and/or data, via the radio access network, with another entity, such as another receiver or a server.

The wireless communication system covers a geographical area which is divided into cell areas, with each cell area being served by a radio network node, or base station, e.g., a Radio Base Station (RBS), which in some networks may be referred to as transmitter, "eNB", "eNodeB", "NodeB" or "B node", depending on the technology and terminology used. Sometimes, also the expression cell may be used for denoting the radio network node itself. However, the cell is also, or in normal terminology, the geographical area where radio coverage is provided by the radio network node/base station at a base station site. One radio network node, situated on the base station site, may serve one or several cells. The radio network nodes communicate over the air interface operating on radio frequencies with the receivers within range of the respective radio network node.

In some radio access networks, several radio network nodes may be connected, e.g., by landlines or microwave, to a Radio Network Controller (RNC), e.g., in Universal Mobile Telecommunications System (UMTS). The RNC, also sometimes termed Base Station Controller (BSC), e.g., in GSM, may supervise and coordinate various activities of the plural radio network nodes connected thereto. GSM is an abbreviation for Global System for Mobile Communications (originally: Groupe Spécial Mobile).

In 3rd Generation Partnership Project (3GPP) Long Term Evolution (LTE), radio network nodes, which may be referred to as eNodeBs or eNBs, may be connected to a gateway, e.g., a radio access gateway, to one or more core networks.

In the present context, the expressions downlink, downstream link or forward link may be used for the transmission path from the radio network node to the receiver. The expression uplink, upstream link or reverse link may be used for the transmission path in the opposite direction, i.e., from the receiver to the radio network node.

During the initial access of a receiver/mobile terminal in a wireless communication system, a connection is established by first detecting and synchronizing to the cell. In the prior art 3GPP LTE system, the receiver establishes a connection to a cell/radio network node, by performing cell search and synchronization using primary and secondary synchronization signals. Once the cell ID has been found and synchronization been established by the receiver, a Physical Broadcast Channel (PBCH) is detected. The PBCH comprises a minimum amount of information for the receiver to be able to proceed receiving other data channels and start camping on the cell. The PBCH has been designed to be very robust since it needs to provide large coverage.

In LTE, the smallest time-frequency entity that can be used for transmission is referred to as a Resource Element (RE), which may convey a complex-valued modulation symbol on a subcarrier. In this context, the RE may be referred to as time-frequency resources. A Resource Block (RB) comprises a set of resource elements or a set of time-frequency resources and is of 0.5 ms duration (e.g., 7 Orthogonal Frequency-Division Multiplexing (OFDM) symbols) and 180 kHz bandwidth (e.g., 12 subcarriers with 15 kHz spacing). The LTE standard refers to a Physical Resource Block (PRB) as a resource block where the set of OFDM symbols in the time-domain and the set of subcarriers in the frequency domain are contiguous. The LTE standard further defines Virtual Resource Blocks (VRBs) which can be of either localized or distributed type. For brevity, sometimes only the notion of resource block is used and a skilled reader would be able to determine the proper term. The transmission bandwidth of the system is divided into a set of resource blocks. Typical LTE carrier bandwidths correspond to 6, 15, 25, 50, 75 and 100 resource blocks. Each transmission of user data on the Physical Downlink Shared Channel (PDSCH) is performed over 1 ms duration, which is also referred to as a subframe, on one or several resource blocks. A radio frame consists of 10 subframes, or alternatively 20 slots of 0.5 ms length (enumerated from 0 to 19).

OFDM is a method of encoding digital data on multiple carrier frequencies. OFDM is a Frequency-Division Multiplexing (FDM) scheme used as a digital multi-carrier modulation method. A large number of closely spaced orthogonal sub-carrier signals are used to carry data. The data is divided into several parallel data streams or channels, one for each sub-carrier.

OFDM has developed into a popular scheme for wideband digital communication, whether wireless or over copper wires, used in applications such as digital television and audio broadcasting, Digital Subscriber Line (DSL) broadband internet access, wireless networks, and 4G mobile communications.

In the prior art 3GPP LTE system, multiple transmit and receive antennas are supported and the notion of antenna port is used. Each downlink antenna port is associated with a unique reference signal. An antenna port may not necessarily correspond to a physical antenna and one antenna port may be associated with more than one physical antenna. In any case, the reference signal on an antenna port may be used for channel estimation for data that is transmitted on the same antenna port.

Channel estimation therefore needs to be performed for all antenna ports that are used for the data transmission. A number of reference signals have been defined in the LTE downlink, e.g., Common Reference Signal (CRS). CRS is a cell-specific reference signal, which is transmitted in all subframes and in all resource blocks of the carrier. The CRS serves as a reference signal for several purposes such as, e.g., demodulation, Channel state information measurements, Time- and frequency synchronization, and/or Radio Resource Management (RRM) and/or mobility measurements.

Up to 4 CRS antenna ports may be accommodated (labelled p=0-3) and a cell may be configured with ports p=0 or p=0, 1 or p=0, 1, 2, 3. Since the CRS provides for multiple purposes, it has to be rather robust and hence has quite a large density, i.e., occupies a large number of resource elements. The disadvantage is that its overhead is significant.

With multiple antennas, it may be at least hypothetically possible to achieve beamforming by applying different complex-valued precoder weights on the different antennas. However, since the CRS is cell-specific, it cannot be receiver-specifically precoded, i.e., it cannot achieve any beamforming gains. On the other hand, the user data on the Physical Downlink Shared Channel (PDSCH) may undergo beamforming since it is not cell-specific. This is done by codebook-based precoding and the chosen precoding matrix is signalled to the receiver. Since the CRS is not precoded and is transmitted every subframe, it is possible to interpolate channel estimates over both time- and frequency domain. This results in improved channel estimation.

A different approach for reference signal design was subsequently introduced in the LTE system, comprising two new reference signals, each having a specific purpose.

One such downlink reference signal defined in LTE is Channel State Information Reference Signal (CSI-RS). CSI-RS is a sparse receiver-specific reference signal used primarily for estimating Channel State Information (CSI) such as, e.g., Channel Quality Indicator (CQI), Pre-coding Matrix Indicator (PMI), Rank Indicator (RI), which the receiver reports to the transmitter/eNodeB. The CSI-RS is transmitted in all resource blocks of the carrier but with a configurable period in time and it is much sparser than the CRS. Up to 8 CSI-RS antenna ports may be accommodated.

Yet another downlink reference signal defined in LTE is Demodulation Reference Signal (DM-RS). DM-RS is a receiver-specific reference signal used primarily as phase and amplitude reference for coherent demodulation, i.e., to be used in channel estimation. It is only transmitted in the resource blocks and subframes where the receiver has been scheduled data, i.e., containing the PDSCH. Up to 8 DM-RS antenna ports may be accommodated.

The DM-RS time-frequency patterns for LTE are defined in the Technical Specification: 3GPP TS36.211 (retrievable over the Internet from: http://www.3gpp.org).

The antenna ports (labelled p=7-14) are multiplexed both by disjoint sets of time-frequency resources as well as by orthogonal cover codes within a set of same time-frequency resources. Since it is receiver-specific, the DM-RS may be precoded with the same precoder used for the PDSCH, hence beamforming gains may be achieved for the reference signal. Since the data and reference signal use the same precoder, the precoding becomes transparent to the receiver which may regard the precoder as part of the channel. Hence, the precoder is not signalled to the receiver. Typically, to maximize the throughput, different precoders may be used in different resource blocks, implying that channel estimates cannot be interpolated between resource blocks. However, the radio network node/eNodeB may signal to the receiver that the same precoder is assumed on a set of contiguous resource blocks, which would allow interpolation in the frequency domain, also being referred to as Physical Resource Block (PRB) bundling. The prior art LTE system does not support interpolation in the time domain, since the DM-RS is only transmitted in the subframes wherein data is transmitted and such transmission may not occur in each subframe, while also different precoders may be used in different subframes. Additionally, DM-RS is also utilised for demodulating some of the downlink control channels, e.g., the Enhanced Physical Downlink Control Channel (EPDCCH). These DM-RSs utilise the same time-frequency patterns as the DM-RSs for the PDSCH but may use another modulation sequence. The 4 EPDCCH antenna ports comprising DM-RS are labelled p=107-110.

FIG. 1 illustrates a resource grid in a subframe, which comprises 12 subcarriers and 14 OFDM symbols, to which antenna ports p=0-3 comprising CRS and antenna ports p=7-14 comprising DM-RS are mapped. The frequency position of the CRS depends on a frequency shift which is a function of the cell ID. FIG. 1 also shows the resource elements for the PBCH.

In the prior art LTE system, at least antenna port p=0 is always transmitted, regardless of the number of configured antenna ports comprising CSI-RS and antenna ports comprising DM-RS. To reduce the overhead, it has been considered to define carriers which do not transmit any antenna port comprising CRS, i.e., antenna ports p=0, 1, 2 and 3. However, there may still be a reference signal which is similar to CRS, e.g., using the same time-frequency resources and/or modulation sequence but is not transmitted in each subframe (e.g., only transmitted in some but not all subframes) and whose purpose is not to serve as a reference for demodulation. Rather, it could be used for measurements related to radio resource management and cell selection procedures. However, the PBCH is relying on CRS-based demodulation since it is transmitted on the antenna ports comprising CRS. Hence, the PBCH as it is currently defined in the prior art LTE system, could not be transmitted. Without the PBCH it would not be possible to access the carrier and it is therefore an open issue to provide a mechanism for transmitting broadcast information and an associated reference signal on a carrier without CRS.

According to prior art, the PBCH in LTE is transmitted in the 6 central resource blocks (72 subcarriers) of the carrier and in the first 4 OFDM symbols of slot 1. The smallest LTE transmission bandwidth configuration of a carrier is 6 resource blocks and the receiver does not know the carrier bandwidth prior to detecting the PBCH. Using 6 resource blocks assures that the PBCH may be detected regardless of the carrier bandwidth and at the same time it provides maximum frequency diversity. FIG. 1 illustrates the PBCH mapping for FDD in one Physical Resource Block (PRB) pair. The data of the PBCH is convolutionally encoded and a 16-bit Cyclic Redundancy Check (CRC) is attached to provide for error detection. The transmission time of the PBCH is 40 ms, i.e., the encoded data is conveyed over 4 radio frames, using the first 4 OFDM symbols of slot 1 in each radio frame. However, the information is mapped such that it would be possible to correctly receive the PBCH from just 1 decoding attempt, i.e., from 1 radio frame. On the other hand, the 40 ms timing is unknown to the receiver which needs to be detected. The scrambling sequence of the PBCH is defined over 40 ms, hence the receiver can blindly detect the 40 ms timing, even from 1 decoding attempt, requiring 4 decoding hypotheses. Having a transmission time of 40 ms spreads the broadcast message over several radio frames and assures that time-diversity can be achieved, e.g., in order to avoid fading dips.

The PBCH is transmitted on the antenna ports comprising CRS. The number of CRS antenna ports may be 1, 2 or 4 but this number is unknown to the receiver prior to detecting the PBCH. Transmit diversity is used for the PBCH when there is more than 1 antenna port comprising CRS. For 2 antenna ports comprising CRS, Space Frequency Block Coding (SFBC) is applied and for 4 antenna ports comprising CRS a combination of SFBC and Frequency Switched Transmit Diversity (FSTD) is used. The receiver is blindly detecting the number of antenna ports comprising CRS by de-mapping the REs of the PBCH under the 3 hypotheses of 1, 2 or 4 antenna ports comprising CRS and corresponding diversity scheme. The PBCH is always mapped to the resource elements assuming 4 antenna ports comprising CRS are used. That is, the resource elements defined for antenna ports p=0-3 are never used to carry the PBCH, regardless of the number of actually configured antenna ports. The CRC is masked with a codeword dependent on the number of antenna ports comprising CRS. Hence, the receiver may verify if the correct number of antenna ports comprising CRS has been detected.

As illustrated in FIG. 1, multiplexing of DM-RS antenna ports is made both by Code Division Multiplexing (by means of orthogonal cover codes) and with Frequency Division Multiplexing, by means of disjoint sets of resource elements. For example, antenna ports p=7, 8, 11 and 13 would be multiplexed by orthogonal cover sequences (the same would apply for antenna ports p=9, 10, 12 and 14). A rank v transmission on the PDSCH is using antenna ports 7 to v+6, at least when the rank v>1. The modulation sequence of the DM-RS can be receiver-specifically configured, i.e., it may not be the same for all receivers in the cell. The reason for this is that it makes it possible to reuse time-frequency resources within a cell for receivers that are sufficiently spatially separated. Having different DM-RS modulation sequences improves the interference suppression ability of the reference signals within the cell. There is no transmit diversity scheme specified for channels that rely on DM-RS demodulation in the prior art LTE system. Still there are transparent ways of improving the spatial diversity, e.g., to apply different precoders in different resource blocks, which sometimes may be referred to as Random Beamforming (RBF). However, in many cases the performance may be worse than schemes relying on transmit diversity, e.g., SFBC.

It is a problem to reliably transmit a broadcast information and/or system information while offering high spectral efficiency of a wireless communication system. This necessitates the ability to multiplex the broadcast information with other channels in the system, including the mapping of the broadcast information to time-frequency resources and definitions of reference signals for its associated antenna ports. It is a further problem to define the reference signals for broadcast information transmission such that the complexity of channel estimation does not become excessive in the receiver. It is also a problem to define the reference signals for broadcast information transmission such that the complexity of mapping other data/control channels to the time-frequency resources is not increased.

In the prior art LTE system, both CRS and DM-RS can be transmitted, which leads to high reference signal overhead, decreased throughput and reduced overall system efficiency.

It is a further objective to define the reference signals for broadcast information transmission in order to minimize the overhead.

Hence, it is a problem to assure that there is a reasonable trade-off between reference signal overhead and performance.

In the sequel, we will refer to methods for transmitting broadcast information in a general sense. This mechanism may alternatively be referred to, in some specific cases, as a broadcast channel. Hence, these terms may be used interchangeably without precluding that a method for transmitting broadcast information may not necessarily require defining a specific broadcast channel.

SUMMARY OF INVENTION

It is therefore an object to obviate at least some of the above mentioned disadvantages and to improve the performance in a wireless communication system.

According to a first aspect, the object is achieved by a method in a radio network node, for transmission of broadcast information. The broadcast information transmission is to be received by a receiver in a wireless communication system, transmitted over a set of antenna ports comprising at least one antenna port, in at least one subframe. The subframe comprises a set of time-frequency resources, wherein a cell-specific reference signal, CRS, is not transmitted in each subframe. The method comprises defining a set of antenna ports for the set of time-frequency resources. Also, the method comprises transmitting the broadcast information on the defined set of antenna ports, thereby using said set of time-frequency resources exclusively, such that they are unused for any other antenna port.

According to a second aspect, the object is achieved by a radio network node, for transmission of broadcast information, which is to be received by a receiver in a wireless communication system. The broadcast information is transmitted over a set of antenna ports comprising at least one antenna port, in at least one subframe comprising a set of time-frequency resources. Further, no cell-specific reference signal, CRS, is transmitted in each subframe. The radio network node comprises a processing circuit, configured for defining a set of antenna ports for the set of time-frequency resources. Also, the radio network node comprises a transmitting unit, configured for transmitting the broadcast information on the defined set of antenna ports, thereby using said set of time-frequency resources exclusively, such that they are unused for any other antenna port.

According to a third aspect, the object is achieved by a method in a receiver. The receiver is configured for reception of broadcast information, over at least one antenna port, in a subframe comprising a plurality of time-frequency resources. The broadcast information is transmitted by a radio network node in a wireless communication system. Further, the set of time-frequency resources is exclusively associated with the set of antenna ports for transmission of the information entity. Also no cell-specific reference signal, CRS, is transmitted in each subframe by the radio network node. The method comprises estimating channel state, to be utilised when communicating with the radio network node. Also, the method comprises receiving broadcast information from the radio network node on a set of antenna ports according to the estimated channel state.

According to a fourth aspect, the object is achieved by a receiver. The receiver is configured for reception of broadcast information, over at least one antenna port, in a subframe comprising a plurality of time-frequency resources.

The broadcast information is transmitted by a radio network node in a wireless communication system, wherein the set of time-frequency resources is exclusively associated with the set of antenna ports for transmission of the information entity. No cell-specific reference signal, CRS, is transmitted in each subframe by the radio network node. The receiver comprises a receiving unit, configured for receiving broadcast information from the radio network node on a set of antenna ports according to an estimated channel state. Also, the receiver comprises a processing circuit, configured for estimating channel state, to be utilised when communicating with the radio network node.

Some advantages according to embodiments herein comprise that network performance is enhanced by maintaining low reference signal overhead. A further advantage according to embodiments herein comprises the ability to efficiently multiplex data/control information in the same subframe as broadcast information transmission.

Thereby is a reasonable trade-off between signalling overhead and performance achieved. Thus an improved performance and spectral utilisation within the wireless communication system is provided.

Other objects, advantages and novel features of the embodiments of the invention will become apparent from the following detailed description.

BRIEF DESCRIPTION OF THE DRAWINGS

Embodiments of the invention are described in more detail with reference to attached drawings illustrating examples of embodiments in which.

DETAILED DESCRIPTION OF INVENTION

Embodiments of the invention described herein are defined as a radio network node, a method in a radio network node, a receiver and a method in a receiver, which may be put into practice in the embodiments described below. These embodiments may, however, be exemplified and realised in many different forms and are not to be considered as limited to the embodiments set forth herein; rather, these embodiments are provided so that this disclosure will be thorough and complete.

Still other objects and features may become apparent from the following detailed description considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 2:
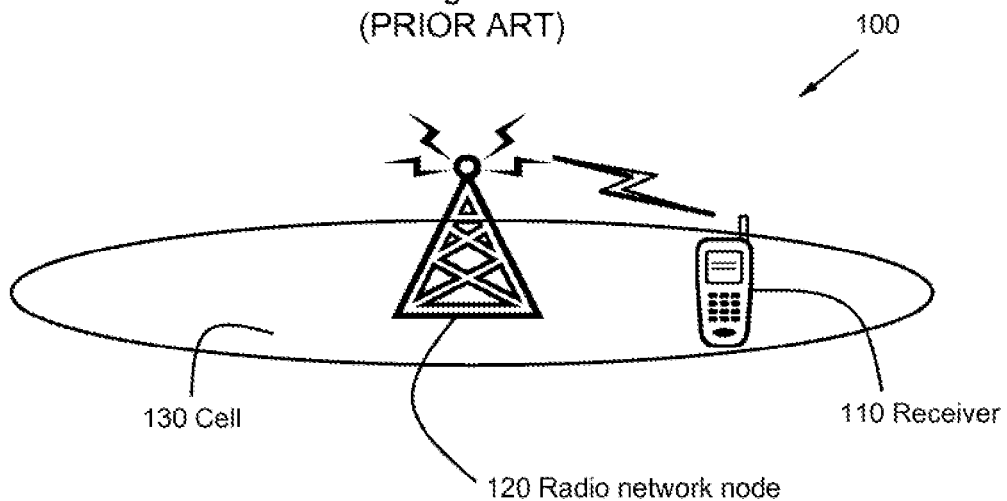
FIG. 2 is a block diagram illustrating an embodiment of the invention.

FIG. 2 is a schematic illustration over a wireless communication system 100. The wireless communication system 100 may at least partly be based on radio access technologies such as, e.g., 3GPP LTE, LTE-Advanced, Evolved Universal Terrestrial Radio Access Network (E-UTRAN), Universal Mobile Telecommunications System (UMTS), Global System for Mobile Communications (originally: Groupe Special Mobile) (GSM)/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), High Speed Packet Access (HSPA) Evolved Universal Terrestrial Radio Access (E-UTRA), Universal Terrestrial Radio Access (UTRA), GSM EDGE Radio Access Network (GERAN), 3GPP2 CDMA technologies, e.g., CDMA2000 1×RTT and High Rate Packet Data (HRPD), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a Guard Period situated in the time domain between the uplink and downlink signalling. FDD means that the transmitter and receiver operate at different carrier frequencies, as have previously been discussed.

The purpose of the illustration in FIG. 2 is to provide a simplified, general overview of the methods and nodes, such as radio network node and receiver herein described, and the functionalities involved. The methods, radio network node and receiver will subsequently, as a non-limiting example, be described in a 3GPP/LTE environment, but the embodiments of the disclosed methods, radio network node and receiver may operate in a wireless communication system 100 based on another access technology such as, e.g., any of the above enumerated. Thus, although the embodiments of the invention are described based on, and using the lingo of, 3GPP LTE systems, it is by no means limited to 3GPP LTE.

The illustrated wireless communication system 100 comprises a receiver 110 and a radio network node 120, which is serving a cell 130.

The radio network node 120 controls the radio resource management within the cell 130, such as, e.g., allocating radio resources to the receiver 110 within the cell 130 and ensuring reliable wireless communication between the radio network node 120 and the receiver 110. The radio network node 120 may typically comprise an eNodeB, e.g., in an LTE-related wireless communication system 100.

The receiver 110 is configured to transmit radio signals comprising information to be received by the radio network node 120. Correspondingly, the receiver 110 is configured to receive radio signals comprising information transmitted by the radio network node 120.

It is to be noted that the illustrated network setting of one receiver 110 and one radio network node 120 in FIG. 2 is to be regarded as a non-limiting example of an embodiment only. The wireless communication system 100 may comprise any other number and/or combination of radio network nodes 120 and/or receivers 110, although only one instance of a receiver 110 and a radio network node 120, respectively, are illustrated in FIG. 3, for clarity reasons. A plurality of receivers 110 and radio network nodes 120 may further be involved in some embodiments of the disclosed invention.

Thus whenever "one" or "a/an" receiver 110 and/or radio network node 120 is referred to in the present context, a plurality of receivers 110 and/or radio network nodes 120 may be involved, according to some embodiments.

The receiver 110 may be represented by, e.g., a UE, a wireless communication terminal, a mobile cellular phone, a Personal Digital Assistant (PDA), a wireless platform, a mobile station, a tablet computer, a portable communication device, a laptop, a computer, a wireless terminal acting as a relay, a relay node, a mobile relay, a Customer Premises Equipment (CPE), a Fixed Wireless Access (FWA) nodes or any other kind of device configured to communicate wirelessly with the radio network node 120, according to different embodiments and different vocabulary.

The radio network node 120 may according to some embodiments be referred to as, e.g., base stations, NodeBs, evolved Node Bs (eNBs, or eNode Bs), base transceiver stations, Access Point Base Stations, base station routers, Radio Base Stations (RBSs), macro base stations, micro base stations, pico base stations, femto base stations, Home eNodeBs, sensors, beacon devices, relay nodes repeaters or any other network nodes configured for communication with the receiver 110 over a wireless interface, depending, e.g., of the radio access technology and terminology used.

Embodiments of the invention herein disclose receiver-specific reference signals for coherent demodulation, such as Demodulation Reference Signals (DM-RS). The DM-RS are configured to support a multitude of scenarios, such as providing reference signals for both data channel demodulation (e.g., PDSCH demodulation) and/or for demodulation of a control channel (e.g., EPDCCH demodulation) in some embodiments, in particular in a scenario wherein no versatile cell-specific CRS is available and may be used instead of the DM-RS.

The embodiments of the invention is further applicable to any channel that utilises DM-RS for demodulation, including, e.g., channels comprising broadcast information or system information.

Figure 1:
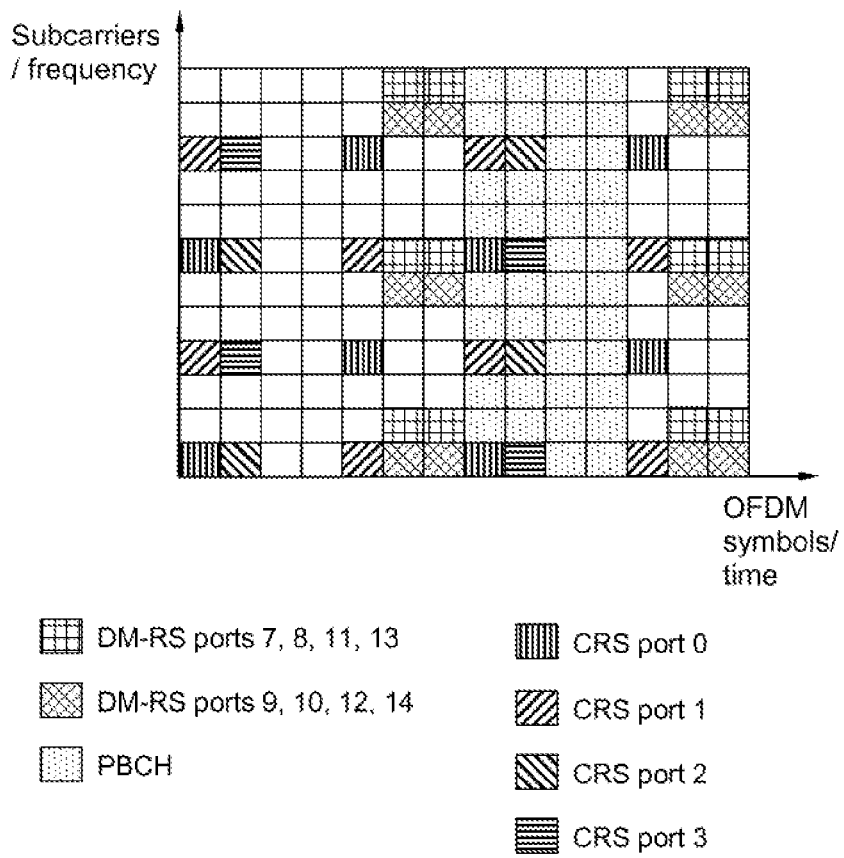
FIG. 1 is a block diagram illustrating a reference signal pattern in a resource block according to prior art.

As exemplified in FIG. 1, in the prior art LTE system there are several available time-frequency resources not used for the PBCH that may be utilised for other channels, e.g., the PDSCH. It is an objective of the invention to provide a method such that the transmission of a broadcast channel allows usage of empty time-frequency resources for other channels.

In the sequel, the terminology from the 3GPP LTE system (PBCH, PDSCH, EPDCCH, reference signals etc.) is occasionally used. However, interchangeably more general notions of channels and signals may be considered, with the same or similar functionality and properties. Exemplary embodiments are given for existing DM-RS signals and antenna ports in LTE. The invention may also apply if new DM-RS signals are defined in the system. A resource block is merely another term for a set of time-frequency resources while a resource element is the smallest possible time-frequency resource; these expressions may be used interchangeably within the present context.

In the prior art LTE system, the PDSCH and the PBCH may be multiplexed in the same subframe due to being transmitted on CRS antenna ports. That is, since the CRS is not precoded, it is suitable for PBCH transmission. At the same time, a precoded PDSCH may be facilitated by signalling of the PDSCH precoder to the receiver 110.

If there is no cell-specific reference signal such as, e.g., the previously discussed CRS, the PDSCH may need to be based on user-specific (alternatively, receiver-specific) reference signal (i.e., DM-RS) demodulation. Thereto, control channels with user-specific reference signals, (e.g., the Enhanced Physical Downlink Control Channel (EPDCCH)) may be used. In one sense, user-specific reference signals may be characterised by that they are only transmitted on time-frequency resources in the vicinity (e.g., same resource blocks) of the associated channel. Furthermore, in LTE, also the DM-RS sequence for the PDSCH may be configured in a receiver-specific manner. This will make it difficult to base a broadcast channel on any of the DM-RS antenna ports, since the broadcast channel needs to be received by all receivers 110 in the cell 130. The receivers 110 may also not have any information concerning the reference signal prior to decoding the broadcast channel other than what may be predetermined, or be derived from the acquisition of the synchronization signals. Therefore, the same DM-RS sequence would need to be used for all receivers 110 that may receive the broadcast channel and it may be unsuitable to use a reference signal having a receiver-specific modulation sequence, e.g., antenna ports p=7-14 in the LTE system. Preferably, the modulation sequence for demodulating the broadcast channel may be pre-determined in some embodiments, since higher-layer signalling comprising information, e.g., including receiver-specific reference signal configurations, cannot be performed prior to broadcast channel reception.

If data transmission (e.g., PDSCH) could not be performed in the same subframe as the broadcast channel, time-frequency resources may be left empty and it leads to throughput decrease and spectrum inefficient use. In particular, there are two critical cases. The first case is when the carrier bandwidth is the same as the broadcast channel transmission bandwidth, such as, e.g., 6 resource blocks. In that case, if the broadcast channel transmission could not be multiplexed with other channels in the subframe, there may be no data transmission by PDSCH in that subframe. The second case is that the effect of not being able to multiplex the broadcast channel transmission with other channels in the subframe may be even more severe for TDD, because the number of downlink subframes is smaller in TDD than FDD. For example, for LTE in UL/DL configuration 0, there may be only 2 downlink normal subframes in a radio frame, of which 1 carries the PBCH. Thus 50% of the downlink normal subframes may not transmit user data when the carrier bandwidth is the same as the broadcast channel bandwidth.

It may be considered to utilise the empty time-frequency resources for other channels such as control channel (e.g., EPDCCH) transmission. On the other hand, the EPDCCH may also rely on a DM-RS sequence that may be configured in a receiver-specific manner which again causes problems. It is an aim of some embodiments to accommodate multiplexing of the broadcast channel with either data channels or control channels that use DM-RS based demodulation.

Some embodiments may comprise broadcast channel multiplexing. According to some embodiments, all users in the cell 130 may be able to decode the broadcast channel. At the same time, the radio network node 120 does not know which receivers 110 are trying to decode the broadcast channel since no connection to the cell 130 has been established prior to broadcast channel reception. In principle, the broadcast channel may be transmitted on one set of time-frequency resources and one set of antenna ports, while another channel, such as, e.g., PDSCH) designated for one (or a set of) specific receivers 110 may be transmitted on the same set of time-frequency resources and another set of antenna ports, thereby spatially multiplexing the broadcast channel with other channels. However, this assumes that the radio network node 120 has sufficient channel knowledge such that it may use beamforming in order to make sure that the interference among the broadcast channel and the other channels is low, for any receiver 110 in the cell 130. This may, typically not be possible to achieve, since the radio network node 120 does not have such channel knowledge, nor does it know the set of receiver 110 decoding the broadcast channel. Hence, to avoid any interference among channels, in one embodiment of this invention, the broadcast channel may be time- and or frequency multiplexed with other channels. Specifically, the set of time-frequency resources used for transmitting the broadcast channel on one set of antenna ports, are unused for any other antenna port.

In some embodiments, the antenna port(s) for the broadcast channel may be based on DM-RS patterns used for demodulation of data channels or control channels, such as, e.g., PDSCH or EPDCCH. That is, at least one of the time-frequency positions, or resource elements, for the reference symbols of the antenna port for the broadcast channel may coincide with at least one time-frequency resource being defined by a DM-RS pattern defined for demodulation of data or control channels in the set of time-frequency resources containing the broadcast channel. In one example, the modulation sequence of the antenna port is pre-determined, e.g., it may be a function of any parameter that may be obtained from the synchronization channels, e.g., the cell ID.

A pre-determined modulation sequence may also be characterized by being the same as a sequence used for certain instances of the EPDCCH demodulation. For example, the EPDCCH may be transmitted in a so called common search space wherein multiple receivers 110 are able to decode an EPDCCH. Thus, the modulation sequence may therefore be the same for all receivers 110 searching the common search space. In one embodiment, at least one antenna port used for transmitting the broadcast information is the same as at least one antenna port in the common search space of the EPDCCH. This has an advantage of simplicity for the receiver 110 since it may not need to implement multiple channel estimators for broadcast information reception and messages in the common search space of the EPDCCH.

In one example, the time-frequency resources for the reference symbols of the antenna port may coincide, e.g., completely, with one or several resource elements for the reference symbols of the antenna ports of an existing DM-RS pattern. In one embodiment, a disjoint set of time-frequency resources are used for the reference symbols of the antenna ports for broadcast information and the antenna ports for PDSCH/EPDCCH transmission. This is to assure that the antenna ports for broadcast information transmission may utilise a pre-defined or cell-specific modulation sequence while the antenna ports for PDSCH/EPDCCH transmission may utilise receiver-specific modulation sequences.

Figure 3A:
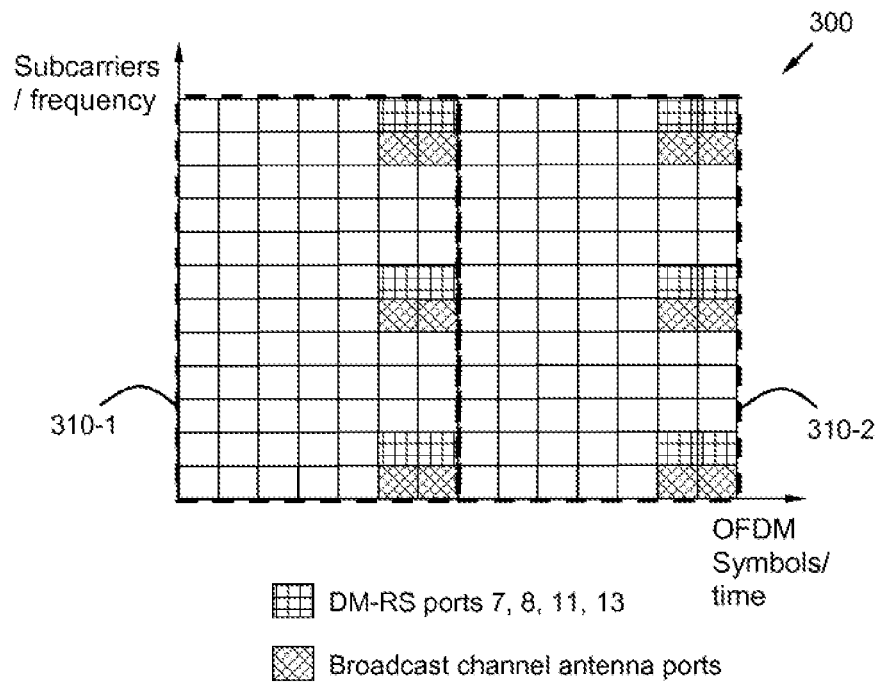
FIG. 3A is a block diagram illustrating a time-frequency resource grid according to an embodiment of the invention.
Figure 3B:
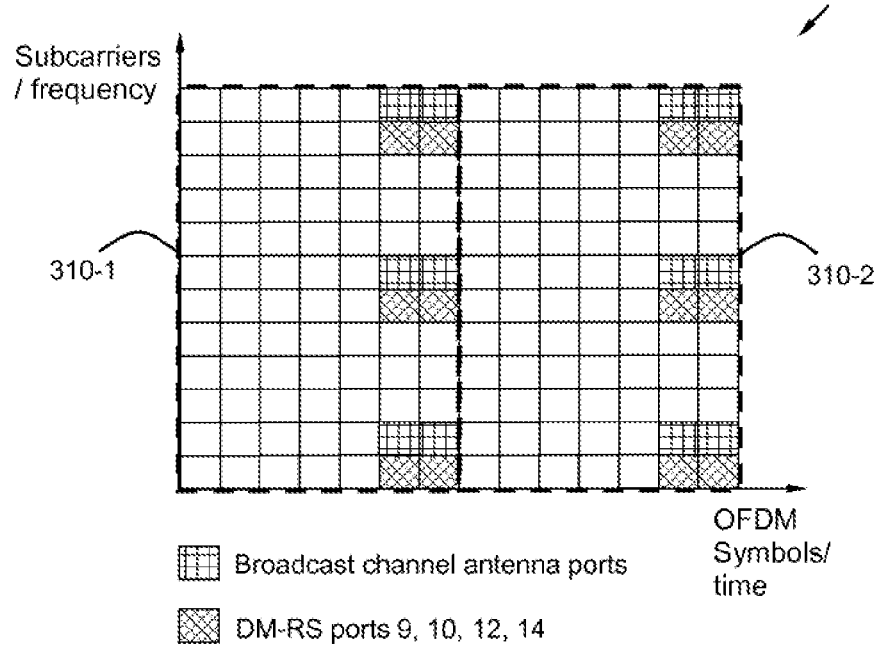
FIG. 3B is a block diagram illustrating a time-frequency resource grid according to an embodiment of the invention.

According to some embodiments, one or more antenna ports may be defined for the broadcast channel. In FIG. 3A and FIG. 3B, an example is illustrated wherein resources are reserved for one or more broadcast antenna ports. An advantage according to some embodiments with having one antenna port may comprise easier and more robust channel estimation as there is no interference between antenna ports. An advantage with having more than one antenna port may comprise the possibility of using transmit diversity.

FIG. 3A shows an example wherein the time-frequency resources defined for antenna ports 9, 10, 12 and 14 are used by the antenna port(s) for the broadcast channel, in a subframe 300 comprising a first resource block 310-1 and a second resource block 310-2.

FIG. 3B shows an example wherein the time-frequency resources defined for antenna ports 7, 8, 11 and 13 may be used by the antenna port(s) for the broadcast channel. An advantage of reusing the time-frequency resources from the existing DM-RS is that the channel estimation complexity may be limited as the same type of interpolation and extrapolation of the channel estimates may be performed for the antenna ports for the broadcast channel. Hence, the receiver 110 does not need to implement any additional channel estimator. A further advantage is that the mapping of other channels (e.g., PDSCH and EPDCCH) to the time-frequency resources may essentially remain the same as in the prior art LTE system, which is advantageous in terms of reducing the complexity for both the transmitter and receiver.

When reusing time-frequency resources of an existing DM-RS pattern for the reference symbols for the broadcast channel antenna ports, said reused resource elements may not be used by the DM-RS for the PDSCH or EPDCCH, if the modulation sequences differ in some embodiments. This effectively means that the number of available DM-RS antenna ports may be reduced which affects the maximum rank of the transmission that may be supported on the PDSCH. The transmission rank typically refers to the number of independent data streams that are spatially multiplexed on the antenna ports, which alternatively may be referred to as the number of layers used for transmission of the data channel. In the prior art LTE system, rank v transmission is associated with antenna ports 7 to 6+v, at least when v>1. For example in FIG. 3A, the maximum rank may be 2 since antenna port 9 could not be transmitted. On the other hand, there are still 4 DM-RS antenna ports (7, 8, 11 and 13). For FIG. 3B, it would not be possible to transmit the PDSCH even with rank 1 since antenna port 7 could not be transmitted. Some embodiments may disclose to solve this problem by introducing additional relations between transmission rank for the data channel and DM-RS antenna port, in the subframes 300 containing the antenna port for the broadcast channel. The relations may apply to all sets of time-frequency resources in the subframe, or only to the sets of time-frequency resources (e.g., RBs, PRBs, PRB pairs, VRBs, VRB pairs etc.) that contain the broadcast channel. An advantage of letting the relations apply to all sets of time-frequency resources in the subframe 300 is that interpolation of channel estimates between sets of time-frequency resources (e.g., by frequency-domain bundling of sets of time-frequency resources, as defined in the LTE system) is easier if the same antenna ports are used in all sets of time-frequency resources. An advantage of letting the relations apply only to the sets of time-frequency resources that contain the broadcast channel, is that it implies no limitations on the number of antenna ports for the sets of time-frequency resources not comprising the broadcast information transmission (e.g., 8 antenna ports may be utilised in LTE).

The relations may be pre-determined and may not incur any additional signalling, according to some embodiments.

Table 1 and Table 2 exemplify two rank-to-antenna port relations for the embodiments illustrated in FIG. 3A and FIG. 3B, respectively. Using these relations, rank 4 transmissions may be supported on the PDSCH in the same subframe comprising the broadcast channel. This is different compared to the prior art LTE system, wherein for transmission ranks larger than 2, at least some of the DM-RS antenna ports would be multiplexed on disjoint sets of time-frequency resources. In these examples, on the contrary to prior art, all antenna ports may be transmitted on the same set of time-frequency resources and be separated by the orthogonal cover codes.

TABLE 1

Relation between transmission rank v and DM-RS antenna port.

| Transmission rank v | DM-RS antenna port |
|---|---|
| 1 | 7 |
| 2 | 7, 8 |
| 3 | 7, 8, 11 |
| 4 | 7, 8, 11, 13 |

TABLE 2

Relation between transmission rank v and DM-RS antenna port.

| Transmission rank v | DM-RS antenna port |
|---|---|
| 1 | 9 |
| 2 | 9, 10 |
| 3 | 9, 10, 12 |
| 4 | 9, 10, 12, 14 |

It should be clear to a skilled reader that the above relations are just examples and other relations may be considered. Similarly, it is also clear that it would be possible to denote the DM-RS antenna ports differently in subframes comprising broadcast channel transmission. For example a new enumeration 207-214 may be used for denoting DM-RS antenna ports for PDSCH transmission in such subframes.

For the EPDCCH, the antenna ports (p=107, 108, 109 and 110) are defined similarly as antenna ports p=7, 8, 9 and 10, i.e., the time-frequency resources defined for antenna port 7 may be the same as defined for antenna port 107 etc. It would therefore become a problem if a set of time-frequency resources/resource blocks 310-1, 310-2 are reused by a broadcast channel antenna port as depicted in FIGS. 3A and/or FIG. 3B, since that would imply that either antenna port 107 and 108 may not be transmitted, or antenna port 109 and 110 may not be transmitted. According to some embodiments, this may be solved by redefining the antenna port mapping for control channels in subframes 300 containing the broadcast channel. The relations may apply to all sets of time-frequency resources in the subframe 300, or only to the resource blocks 310-1, 310-2, i.e., sets of time-frequency resources, that contain the broadcast channel, according to different embodiments. This may involve defining an additional set of antenna ports for the EPDCCH, e.g., p=111, 112, 113 and 114, corresponding to the antenna ports 11, 12, 13 and 14.

Table 3 and Table 4 exemplify antenna port relations between EPDCCH DM-RS in subframes 300 with a broadcast channel and DM-RS in subframes 300 without broadcast channel for FIG. 3A and/or FIG. 3B, respectively. The relation describes the relation of used time-frequency resources in the reference signal pattern, but does not indicate any relation between the modulation sequences.

TABLE 3

Relation between EPDCCH antenna ports.

| EPDCCH antenna port in subframe without broadcast channel | EPDCCH antenna port in subframe with broadcast channel |
|---|---|
| 107 | 107 |
| 108 | 108 |
| 109 | 111 |
| 110 | 113 |

TABLE 4

Relation between EPDCCH antenna ports.

| EPDCCH antenna port in subframe without broadcast channel | EPDCCH antenna port in subframe with broadcast channel |
|---|---|
| 107 | 109 |
| 108 | 110 |
| 109 | 112 |
| 110 | 114 |

If random beamforming is applied, it may be sufficient to only define 1 antenna port for the broadcast channel. On the other hand, if some more advanced transmit diversity scheme is to be used, e.g., based on SFBC, at least 2 antenna ports for the broadcast channel may be defined. An advantage according to some embodiments of the invention wherein the antenna ports comprise time-frequency resources of the DM-RS, is that the same antenna port multiplexing may be applicable to broadcast channel antenna ports. For example, the 12 time-frequency resources depicted in FIG. 3A and FIG. 3B for the broadcast channel antenna port may be utilised in the same manner as for the DM-RS antenna ports to multiplex up to 4 antenna ports by a set of length-4 orthogonal cover codes, according to some embodiments.

Furthermore, the broadcast channel may not occupy all time-frequency resources in a subframe, e.g., as exemplified by the PBCH mapping in FIG. 1. There may therefore be unused time-frequency resources on the resource grid defined by the broadcast channel antenna port(s). These time-frequency resources may be utilised for transmitting data or control information. Hence, in one embodiment of the invention, the broadcast channel antenna port(s) may be utilised for additionally transmitting data or control information. For example in the embodiment illustrated in FIG. 3A, time-frequency resources not used for transmitting the broadcast channel, not used for transmitting antenna ports p=7, 8, 11 and 13 and not used for transmitting the broadcast channel antenna port(s), may be utilised for transmission of data or control information on the broadcast channel antenna port(s). This would be advantageous if the information is common for a set of receivers such that receiver-specific precoding is not applicable. Such control information may include the messages from a common search space of the EPDDCH. The same set of time-frequency resources may alternatively be used for transmission of data or control information on antenna ports p=7, 8, 11 and 13 according to some embodiments. An advantage in this case is that these antenna ports may provide receiver-specific precoding gains.

In one embodiment, the antenna port(s) for the broadcast channel may be based on the time-frequency pattern of an existing cell-specific reference signal, such as, e.g., CRS. That is, at least one of the time-frequency positions/resource elements for the reference symbols of the antenna port for the broadcast channel coincide with at least one time-frequency resource being defined by the CRS in the set of time-frequency resources containing the broadcast channel. The modulation sequence of the antenna port may be pre-determined or cell-specific, e.g., it may be a function of any parameter obtainable from the synchronization channels, such as, e.g., physical layer cell ID (CID). The cell ID is a generally unique number used to identify each radio network node 120, or a sector of the radio network node 120 in a wireless communication system 100. Cell ID may operate in most types of wireless communication systems 100, including, e.g., GSM, GPRS, and UMTS/HSDPA networks.

The time-frequency positions/resource elements for the reference symbols of the antenna port may in some embodiments coincide with time-frequency positions/resource elements of a CRS. An advantage of using the same time-frequency resources as a CRS, is that the mapping of the broadcast information as well as of other channels (e.g., PDSCH and EPDCCH) to the time-frequency resources may essentially remain the same as in the prior art LTE system, which is advantageous in terms of reducing the complexity for both the transmitter and receiver.

A pre-determined modulation sequence may also be characterised by being the same as a sequence used for certain instances of the EPDCCH demodulation. For example, the EPDCCH may be transmitted in a so called common search space wherein multiple receivers 110 are able to decode it.

An advantage according to those embodiments may be that all the DM-RSs (p=7-14) would be available since the time-frequency resources for the DM-RS and the CRS do not coincide in the prior art LTE system. Up to rank 8 transmission on the PDSCH may therefore be supported in the subframes 300 containing the broadcast channel. A further advantage may be that, when the time-frequency resources for reference symbols of the antenna ports for the broadcast information transmission completely coincide with those of the CRS, the CRS-based transmit diversity schemes defined for the PBCH may also be applied to this broadcast channel. Furthermore, the system planning of a prior art LTE system is typically made such that the frequency shifts of the CRS of neighbouring cells are different. By basing the reference symbols for the antenna ports for the broadcast information transmission on a time-frequency pattern that, at least partially, coincides with the CRS, it is ensured that the system does not need to be re-planned when introducing a carrier without CRS in each subframe.

Examples of time-frequency resources that may be used are those defined by CRS antenna port p=0 or antenna ports p=0 and 1 or antenna ports p=0, 1, 2 and 3. In general it is desirable to minimize the number of time-frequency resources for the reference signal provided that sufficient channel estimation performance may be guaranteed.

Figure 4A:
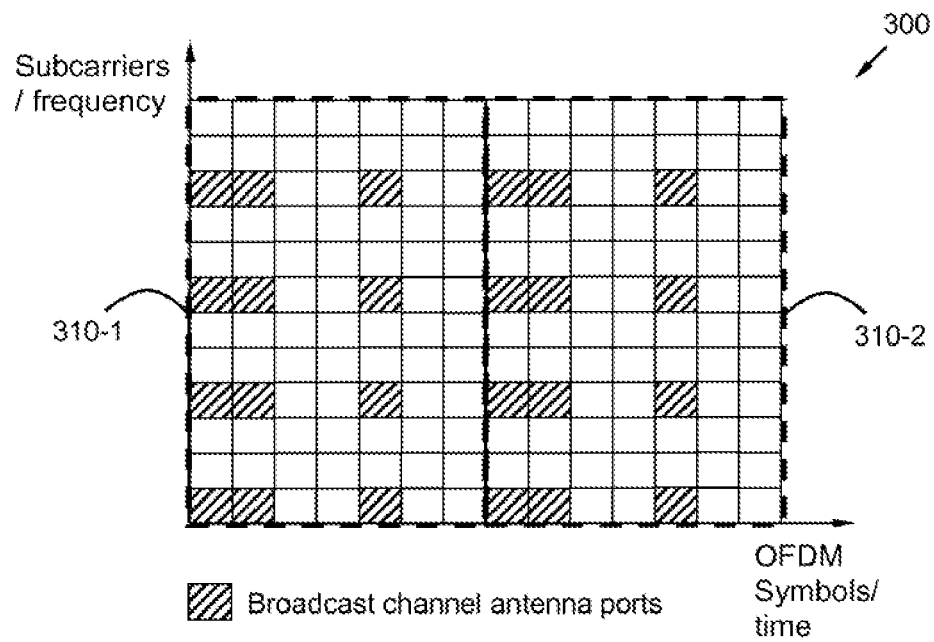
FIG. 4A is a block diagram illustrating a time-frequency resource grid according to an embodiment of the invention.
Figure 4B:
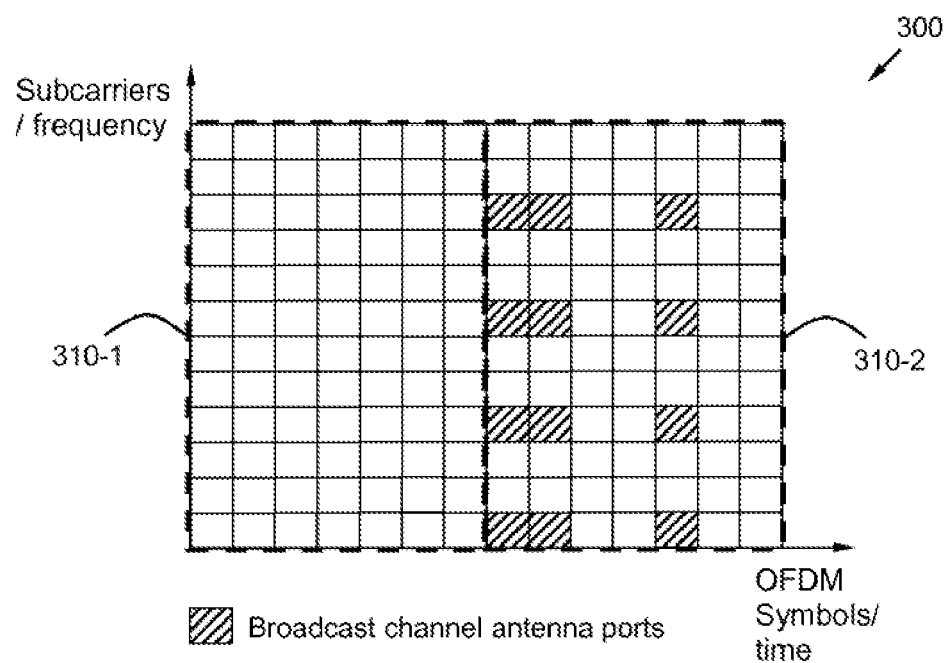
FIG. 4B is a block diagram illustrating a time-frequency resource grid according to an embodiment of the invention.

FIG. 4A shows an embodiment where all CRS time-frequency resources in a subframe 300 are used. FIG. 4B shows another embodiment where only CRS time-frequency resources from the second slot of the subframe 300 are used. The embodiment illustrated in FIG. 4B may be suitable if the broadcast channel is mapped to OFDM symbols in the second slot.

A further merit according to some embodiments may be that the reference signal may partially be used for additional purposes such as measurements for mobility, e.g., as described for the CRS. This may be possible if the reference signal corresponding to CRS antenna port p=0 is transmitted over the whole carrier bandwidth, or at least over not less than the minimum transmission bandwidth configuration, e.g., resource blocks 310-1, 310-2. Time-frequency resources corresponding to CRS antenna ports p=1, 2 and 3 may not need to be transmitted over the whole carrier bandwidth and to reduce any overhead, they may be transmitted only in the sets of time-frequency resources containing the broadcast channel, i.e., wherein the broadcast information transmission is made. Hence, according to some embodiments, time-frequency resources of the reference symbols for a CRS may be reused and letting the bandwidth of the different broadcast channel antenna ports be different but at least always cover the sets of time-frequency resources wherein the broadcast channel is transmitted.

Figure 5:
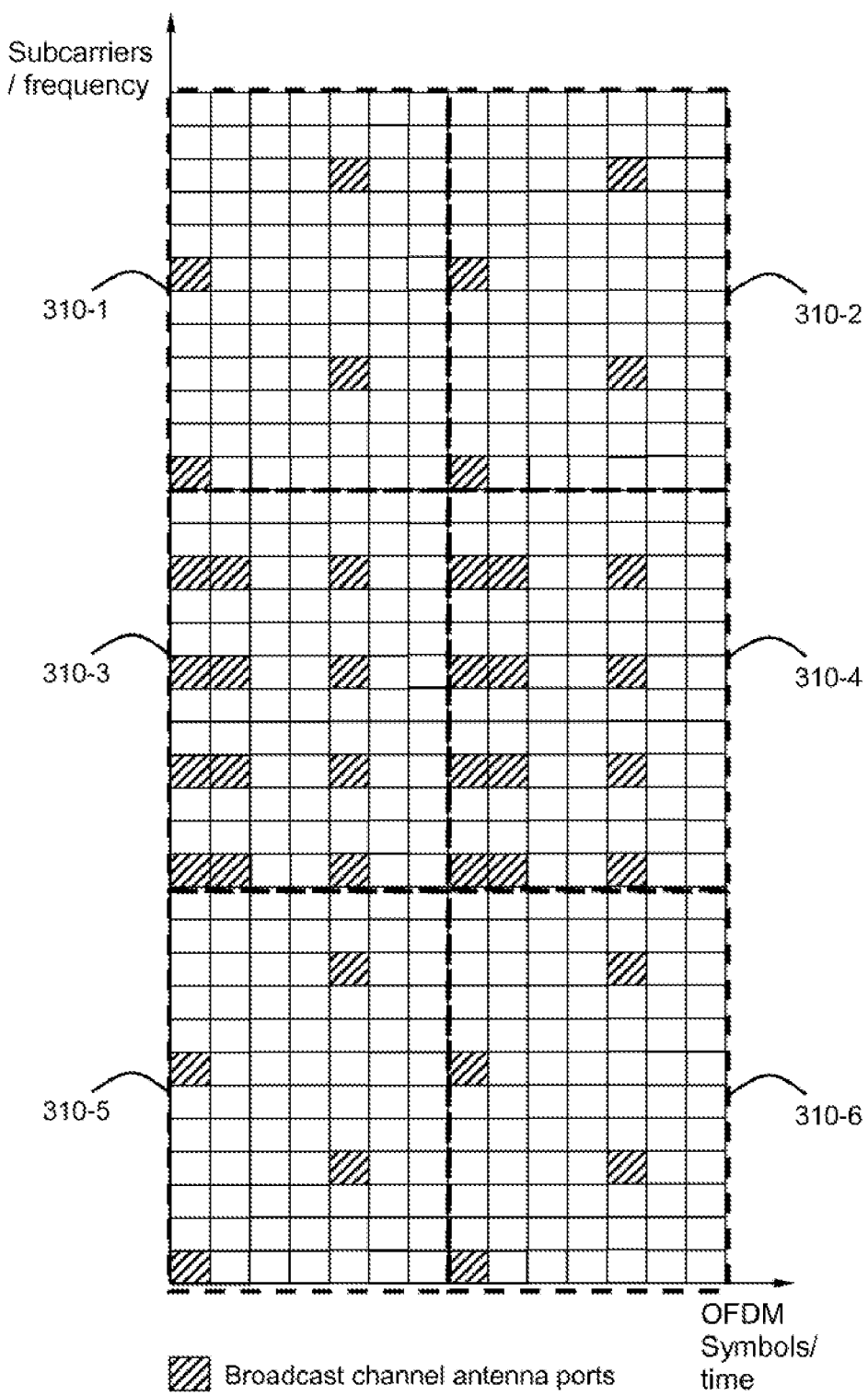
FIG. 5 is a block diagram illustrating a time-frequency resource grid according to an embodiment of the invention.

FIG. 5 illustrates one example of a carrier with a bandwidth of 3 sets of resource block pairs 310-1, 310-2, 310-3, 310-4, 310-5, 310-6, or 3 sets of time-frequency resources, where the set of time-frequency resources corresponding to the resource elements for reference symbols on antenna port p=0 span the whole carrier bandwidth while the set of time-frequency resources corresponding to the resource elements for reference symbols on antenna ports p=1, 2 and 3 are only present in the central set of time-frequency resources, i.e., resource blocks 310-3, 310-4, wherein the broadcast information transmission may be transmitted according to some embodiments. Thus, the density in terms of resource elements for reference symbols on the antenna port for the broadcast information transmission may differ among different sets of time-frequency resources/resource blocks 310-1, 310-2, 310-3, 310-4, 310-5, 310-6.

In one embodiment, the broadcast information transmission may be made over at least one antenna port, which may be the antenna port used for transmission of a synchronization signal. The synchronization signal might include at least one or both of primary synchronization signal and secondary synchronization signal in LTE according to different embodiments. Since the synchronization signals could be assumed to be correctly detected prior to decoding the broadcast channel, it is realised that the modulation symbols constituting the synchronization signals would be known to the receiver and could serve as reference symbols in estimating the channel for decoding the broadcast information transmission. Since there are 24 resource elements per subframe carrying modulation symbols of the synchronization signals, reliable channel estimation could be expected. Since the synchronization signals are anyway transmitted, no additional overhead for reference symbols for broadcast information transmission would occur.

One advantage of this embodiment may be that, since the at least one antenna port may be used for both broadcast information transmission and synchronization signal, the channel estimation for broadcast channel detection may be performed based on synchronization signal and then no reference symbols may be needed to detect the broadcast information transmission which improves the spectral efficiency of the system. A further advantage is that no time-frequency resources from the DM-RS antenna ports need to be used for the broadcast information transmission. Hence, an advantage may be that all the antenna ports (p=7-14) comprising DM-RS may become available allowing for efficient multiplexing between the PDSCH and the broadcast information transmission. Up to rank 8 transmission on the PDSCH may therefore be supported in the subframes 300 containing the broadcast channel in some cases.

Figure 6A:
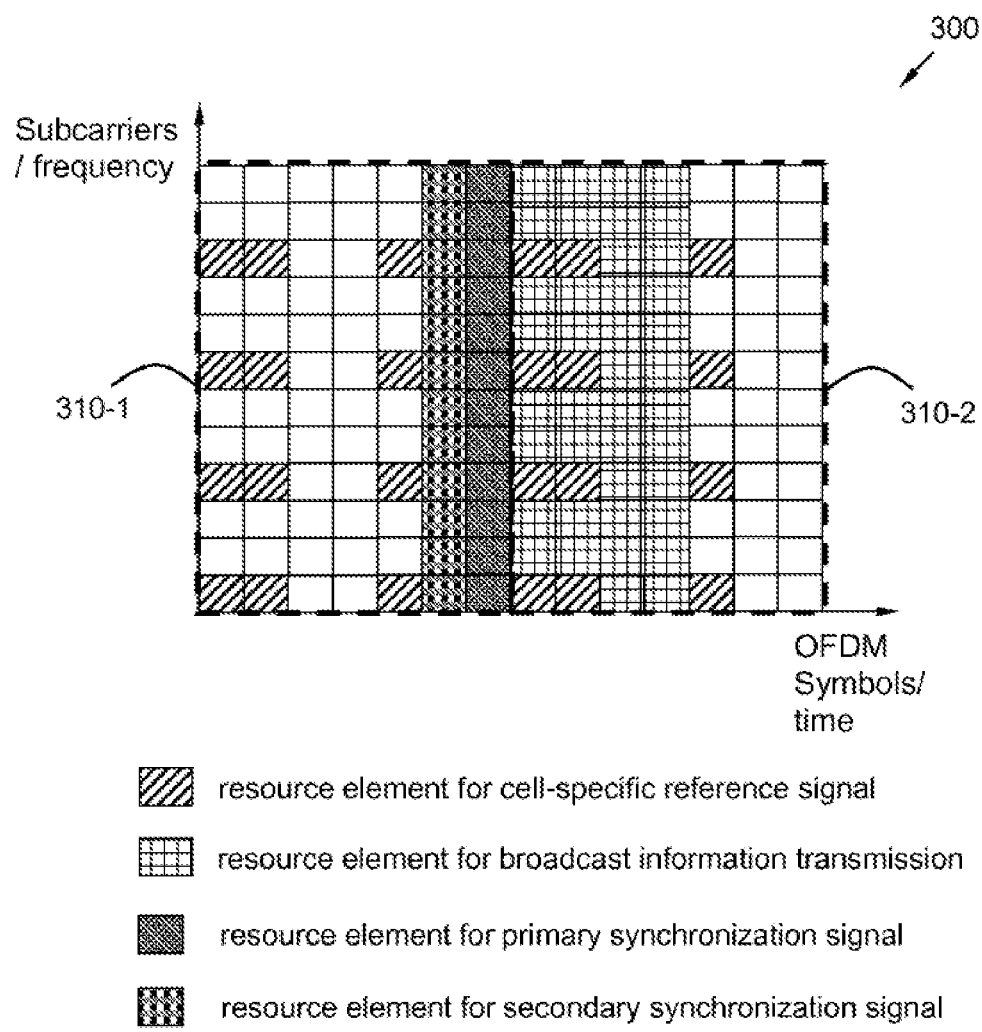
FIG. 6A is a block diagram illustrating a time-frequency resource grid according to an embodiment of the invention.
Figure 6B:
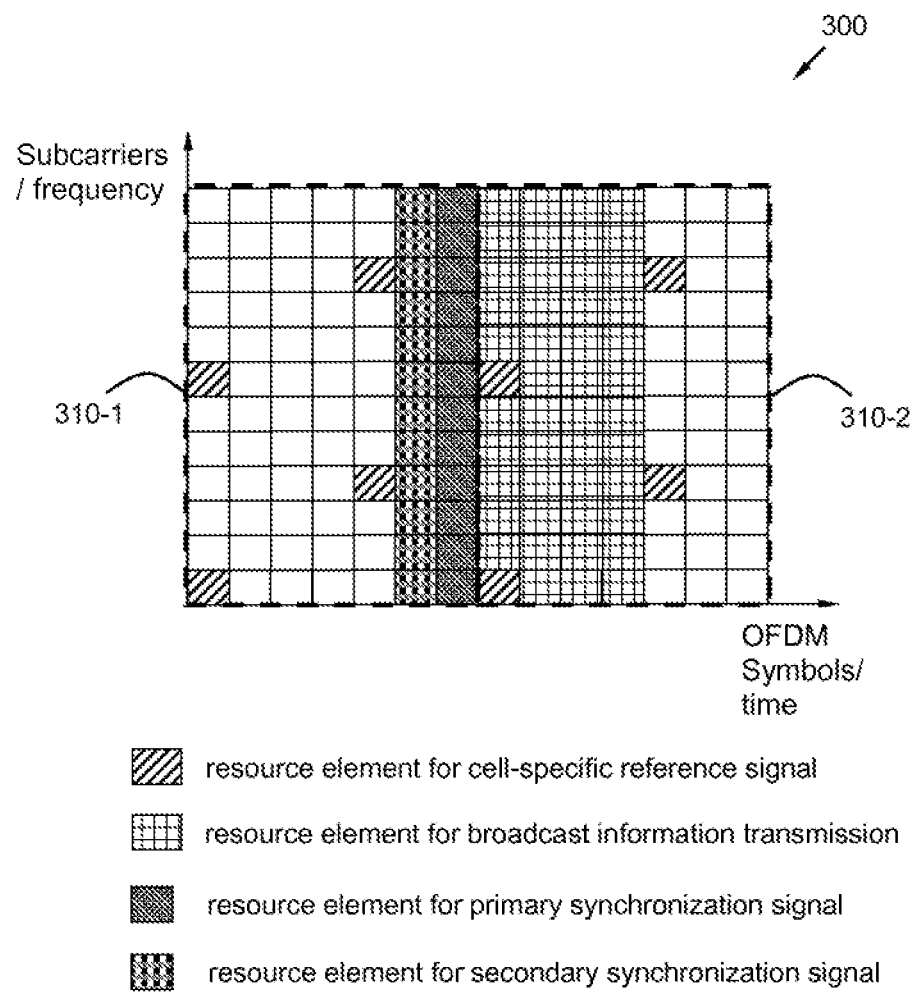
FIG. 6B is a block diagram illustrating a time-frequency resource grid according to an embodiment of the invention.
Figure 6C:
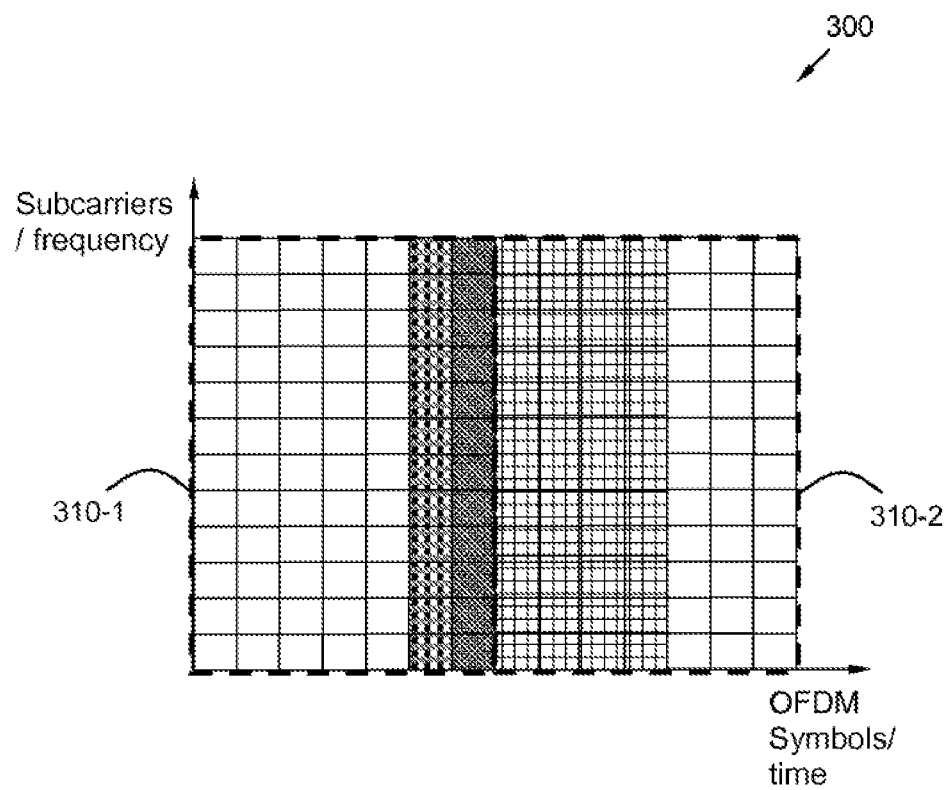
FIG. 6C is a block diagram illustrating a time-frequency resource grid according to an embodiment of the invention.

FIG. 6A, FIG. 6B and FIG. 6C show different embodiments wherein the broadcast information transmission may be made in a subframe 300 over the same antenna port as for primary synchronization signal and secondary synchronization signal. It is noted that there may be some subframes wherein reference signals will be transmitted, e.g., comprising the same resource elements of a cell-specific reference signal, CRS. Such reference signals may have different purpose and are not to be used for demodulating the broadcast channel, while the broadcast channel may still need to be mapped around such reserved time-frequency resources. In FIG. 6A, resource elements for reference symbols corresponding to all CRS may be reserved on each of the PRB pairs of broadcast channel. In the embodiment illustrated in FIG. 6B, only resource elements for reference symbols corresponding to antenna port p=0 may be reserved on each of the PRB pairs of broadcast channel. In FIG. 6C, an embodiment is illustrated wherein no resource elements are reserved for reference symbols on each of the PRB pairs of the broadcast channel. In all cases, the synchronization signals constitute the reference symbols to be used for demodulating the broadcast information transmission. Reference signals associated with other antenna ports, such as time-frequency resources of the cell-specific reference signals, CRS, may be used for other purposes such as measurements for mobility.

Furthermore, the above described embodiments wherein time-frequency resources may be used in parts of the subframe 300 and on parts of the carrier bandwidth may be combined with each other.

Figure 7:
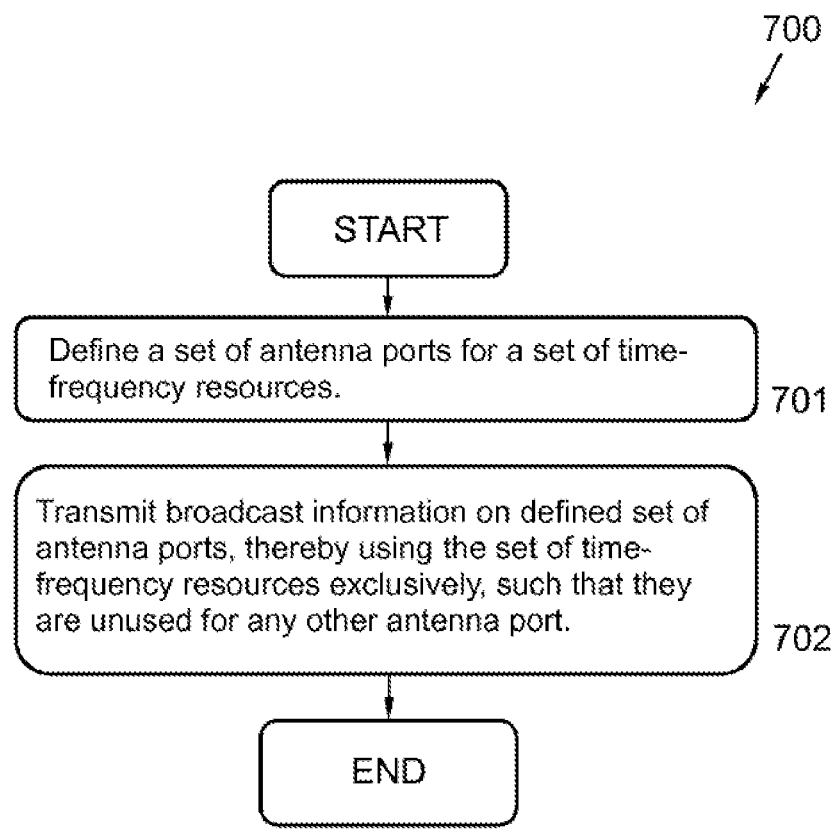
FIG. 7 is a flow chart illustrating a method in a radio network node according to an embodiment of the invention.

FIG. 7 is a flow chart illustrating embodiments of a method 700 in a radio network node 120 for transmission of broadcast information. The broadcast information is transmitted over a set of antenna ports comprising at least one antenna port, in a subframe 300 comprising a set of time-frequency resources. The set of time-frequency resources may be referred to as resource blocks 310-1, 310-2. Further, the information entity is to be received by a receiver 110 in a wireless communication system 100. Thereby, a channel state estimation measurement may be enabled on the receiver side based on the reference symbols of the set of antenna ports used for transmitting the broadcast information. The set of time-frequency resources is exclusively associated with the set of antenna ports for transmission of the information entity. No cell-specific reference signal, CRS, is transmitted in each subframe 300. The time-frequency resources may also be referred to as Resource Elements, and the sets of time-frequency resources may be referred to as resource blocks 310-1, 310-2.

The wireless communication system 100 may be based on an LTE system. The receiver 110 may be a User Equipment (UE). The radio network node 120 may be an evolved NodeB, eNodeB. The data channel may be a Physical Downlink Shared Channel (PDSCH). The control channel may be an Enhanced Physical Downlink Control Channel (EPDCCH). The invention would be further applicable to enhancements of prior art control channels such as Physical Hybrid ARQ Indicator Channel (PHICH) or the Physical Control Format Indicator Channel (PCFICH) incorporating DM-RS based demodulation.

To appropriately perform the transmission, the method 700 may comprise a number of actions 701-702.

It is however to be noted that any, some or all of the described actions 701-702, may be performed in a somewhat different chronological order than the enumeration indicates, or even be performed simultaneously. The method 700 may comprise the following actions:

Action 701

A set of antenna ports is defined for the set of time-frequency resources.

At least one of the set of time-frequency resources for reference symbols of the set of antenna ports may coincide with at least one time-frequency resource defined for a Demodulation Reference Signal (DM-RS) which may be defined for demodulation of data and/or control channels in a subframe 300 comprising a broadcast information transmission, according to some embodiments.

The set of time-frequency resources for reference symbols of the set of antenna ports may in some embodiments comprise the time-frequency resources defined by a DM-RS.

An additional set of antenna ports may be defined for the control channel.

Action 702

The broadcast information is transmitted on the defined 701 set of antenna ports, thereby using said set of time-frequency resources exclusively, such that they are unused for any other antenna port.

A disjoint set of time-frequency resources may be used, according to some embodiments for reference symbols of the set of the defined 701 antenna ports and the antenna ports comprising a DM-RS, for data and/or control channel transmission in some embodiments.

At least one antenna port used for transmitting the broadcast information may be the same as at least one antenna port defined for transmission of a control channel in a common search space, according to some embodiments.

The set of antenna ports used for transmission of broadcast information in addition may also be used for transmission of data and/or control information.

The set of antenna ports used for broadcast information transmission may comprise at least one antenna port which may be used for transmission of a synchronization signal.

The synchronization signal may comprise the primary synchronization signal and/or secondary synchronization signal in a wireless communication system 100 based on Long Term Evolution (LTE), according to some embodiments.

A relation may be defined between a number of layers used for transmission of the data channel and the antenna ports comprising a DM-RS, in a subframe 300 comprising the antenna port for the broadcast information transmission, which relation may be applicable either to all time-frequency resources in the subframe 300, or to resource block pairs 310-1, 310-2 comprising the broadcast information transmission according to different embodiments.

The relation between the number of layers used for transmission of the data channel and the antenna ports comprising a DM-RS may be defined such that at least one number of layers used for transmission of the data channel may be associated with an antenna port comprising a DM-RS which may be different from the antenna port with the number 6 added to the number of layers used for transmission of the data channel, in some embodiments.

Thus the rank v transmission may be associated with antenna port (6+v), in some embodiments.

The number of layers used for transmission of the data channel may be at least two according to some embodiments.

The antenna port relation for downlink control channels in subframes 300 comprising the broadcast information transmission may be differentiated, either for all time-frequency resources in the subframe 300, or for the resource block pairs 310-1, 310-2 comprising the broadcast information transmission.

At least one of the time-frequency resources for reference symbols of the set of antenna ports for the broadcast information transmission may in some embodiments coincide with at least one time-frequency resource being defined by a Cell-specific Reference Signal (CRS) in a resource block 310-1, 310-2 comprising the broadcast information transmission.

The time-frequency resources for reference symbols of the set of antenna ports for the broadcast information transmission may be the same as the time-frequency resources for reference symbols of an antenna port comprising CRS, in at least a first and/or a second half of a subframe 300 according to some embodiments.

The time-frequency resources for the reference symbols for antenna ports comprising CRS may be reused in some embodiments, and the number of resource blocks 310-1, 310-2 may comprise the reference symbols of different antenna ports in the set of antenna ports used for the broadcast information transmission which may be different, covering at least the resource blocks 310-1, 310-2 wherein the broadcast information transmission is made.

The number of time-frequency resources for the reference symbols of the set of antenna ports for the broadcast information transmission may be different among resource blocks 310-1, 310-2. Further, the number of time-frequency resources for the reference symbols of the set of antenna ports used for broadcast information transmission may be larger in a resource block 310-1, 310-2 wherein broadcast information transmission is made, than in another resource block 310-1, 310-2.

According to some embodiments, the reference modulation sequence and/or reference symbols of the set of antenna ports may be predefined, or determinable by information detectable from the synchronization signal.

Figure 8:
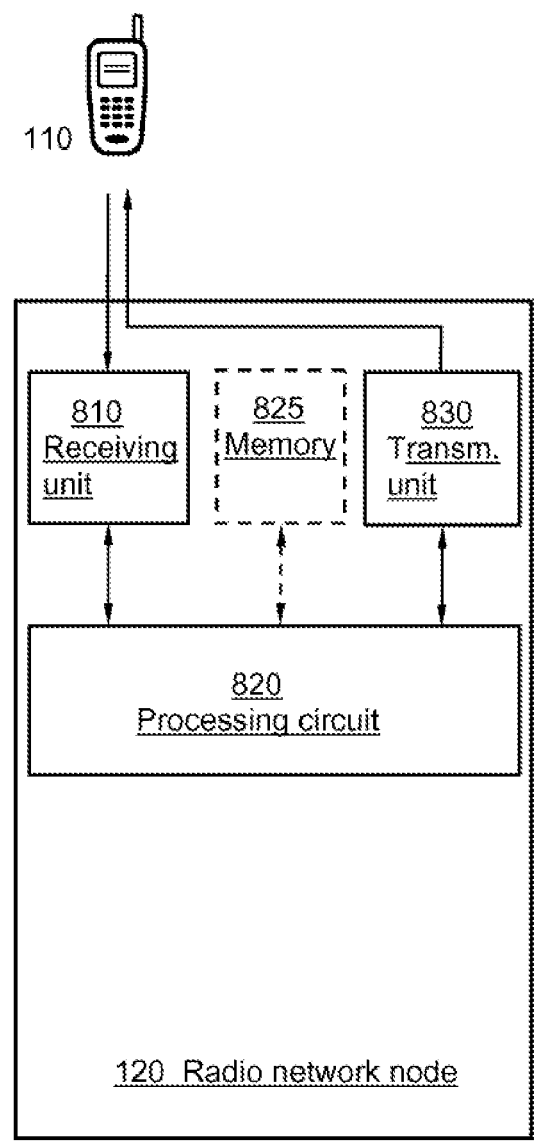
FIG. 8 is a block diagram illustrating a radio network node according to an embodiment of the invention.

FIG. 8 is a block diagram illustrating a radio network node 120 in a wireless communication system 100. The radio network node 120 is configured for transmitting broadcast information, which is to be received by a receiver 110 in a wireless communication system 100. The broadcast information is transmitted over a set of antenna ports comprising at least one antenna port, in at least one subframe 300 comprising a set of time-frequency resources, wherein no cell-specific reference signal, CRS, is transmitted in each subframe 300.

According to some embodiments, the wireless communication system 100 may be based on an LTE system. The receiver 110 may be a User Equipment (UE). The radio network node 120 may be an evolved NodeB, eNodeB. The data channel may be a Physical Downlink Shared Channel (PDSCH). The control channel may be an Enhanced Physical Downlink Control Channel (EPDCCH).

The radio network node 120 is configured to perform the different embodiments of the above described method 700 according to any, some or all of the actions 701-702 for transmitting broadcast information.

For enhanced clarity, any internal electronics or other components of the radio network node 120, not completely indispensable for understanding the herein described embodiments have been omitted from FIG. 8.

The radio network node 120 comprises a processing circuit 820, configured for defining a set of antenna ports for the set of time-frequency resources.

The processing circuit 820 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The processing circuit 820 may further perform data processing functions for inputting, outputting, and processing of data comprising data buffering and device control functions, such as call processing control, user interface control, or the like.

Further, the radio network node 120 also comprises a transmitting unit 830, configured for transmitting the broadcast information on the defined set of antenna ports, thereby using said set of time-frequency resources exclusively, such that they are unused for any other antenna port.

In addition, according to some embodiments, the radio network node 120 may comprise a receiving unit 810, configured for receiving radio signals over a wireless interface. The radio signals may be received from, e.g., the receiver 110, or any other entity configured for wireless communication according to some embodiments.

Furthermore, the radio network node 120 may comprise at least one memory 825, according to some embodiments. The memory 825 may comprise a physical device utilised to store data or programs, i.e., sequences of instructions, on a temporary or permanent basis. According to some embodiments, the memory 825 may comprise integrated circuits comprising silicon-based transistors. Further, the memory 825 may be volatile or non-volatile.

The actions 701-702 to be performed in the radio network node 120 may be implemented through the one or more processing circuits 820 in the radio network node 120, together with computer program code for performing the functions of the actions 701-702. Thus a computer program product, comprising instructions for performing the actions 701-702 in the radio network node 120 may perform transmission of broadcast information, which is to be received by a receiver 110 in a wireless communication system 100, transmitted over a set of antenna ports comprising at least one antenna port, in at least one subframe 300 comprising a set of time-frequency resources, wherein a cell-specific reference signal, CRS, is not transmitted in each subframe 300.

The computer program product mentioned above may be provided for instance in the form of a data carrier carrying computer program code for performing at least some of the actions 701-702 according to some embodiments when being loaded into the processing circuit 820. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the radio network node 120 remotely, e.g., over an Internet or an intranet connection.

Figure 9:
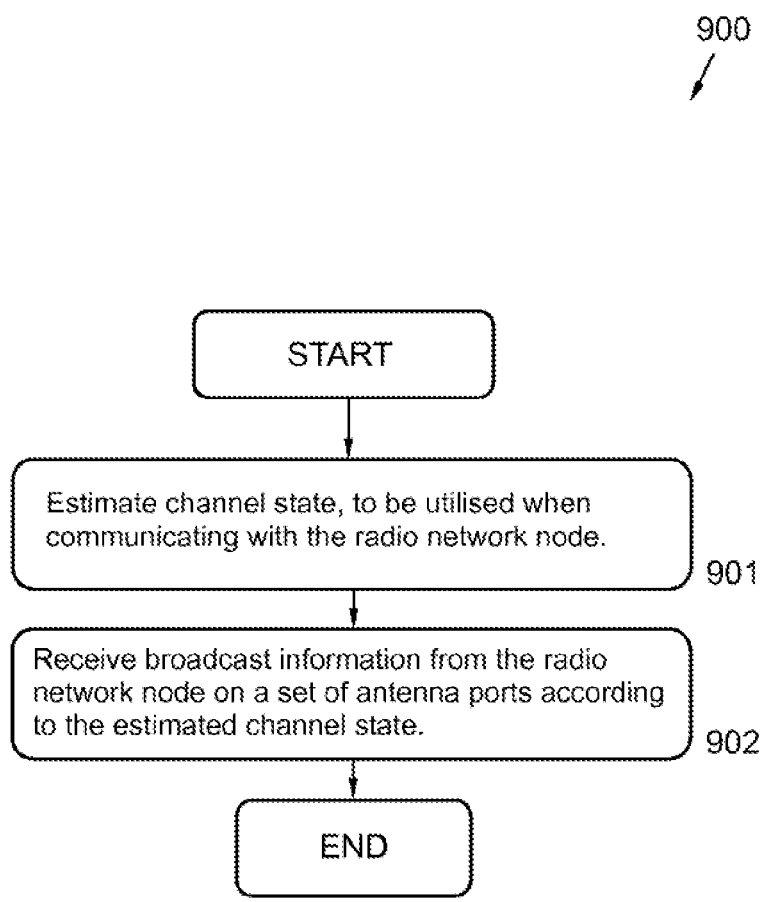
FIG. 9 is a flow chart illustrating a method in a receiver according to an embodiment of the invention.

FIG. 9 is a flow chart illustrating embodiments of a method 900 for use in a receiver 110 in a wireless communication system 100. The method 900 aims at receiving broadcast information, over at least one antenna port, in a subframe 300 comprising a plurality of time-frequency resources. The broadcast information is transmitted by a radio network node 120 in a wireless communication system 100. The set of time-frequency resources is exclusively associated with the set of antenna ports for transmission of the information entity and wherein no cell-specific reference signal is transmitted in each subframe 300 by the radio network node 120.

The wireless communication system 100 may be based on an LTE system. The receiver 110 may be a User Equipment (UE). The radio network node 120 may be an evolved NodeB, eNodeB. The data channel may be a Physical Downlink Shared Channel (PDSCH). The control channel may be an Enhanced Physical Downlink Control Channel (EPDCCH).

To appropriately perform the reception of the information entity, the method 900 may comprise a number of actions 901-902.

It is however to be noted that any, some or all of the described actions 901-902, may be performed in a somewhat different chronological order than the enumeration indicates, or even be performed simultaneously. The method 900 may comprise the following actions:

Action 901

A channel state is estimated, to be utilised when communicating with the radio network node 120. The estimation is made based on the reference symbols of the set of antenna ports used for the broadcast information transmission.

Action 902

Broadcast information is received from the radio network node 120 on a set of antenna ports according to the estimated 901 channel state.

Figure 10:
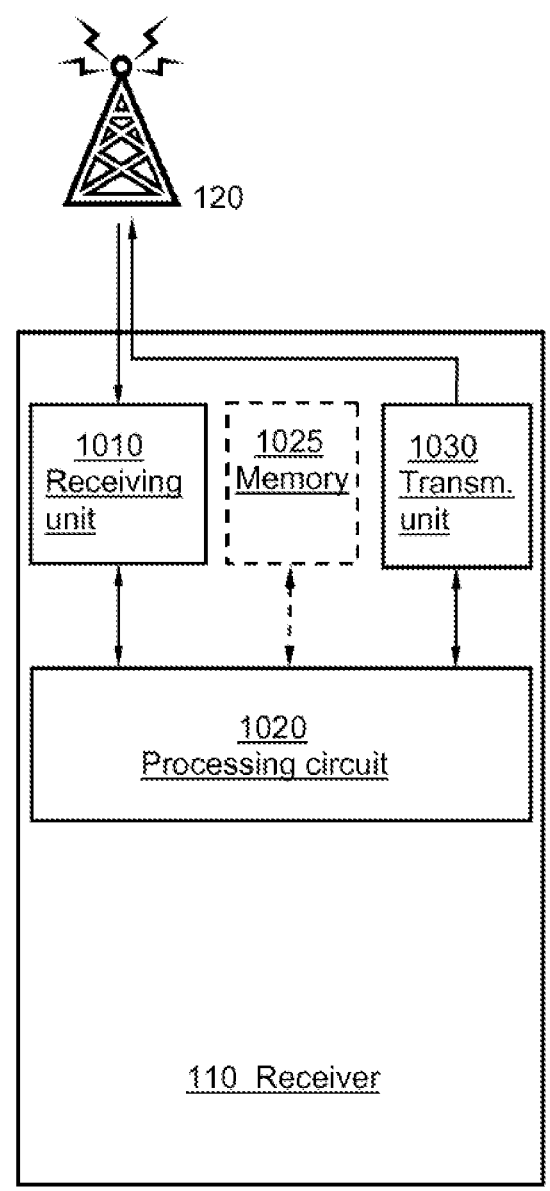
FIG. 10 is a block diagram illustrating a receiver according to an embodiment of the invention.

FIG. 10 is a block diagram illustrating a receiver 110 in a wireless communication system 100. The receiver 110 is configured for receiving broadcast information, over at least one antenna port, in a subframe 300 comprising a plurality of time-frequency resources. The broadcast information is transmitted by a radio network node 120 in a wireless communication system 100, wherein the set of time-frequency resources is exclusively associated with the set of antenna ports for transmission of the information entity. Further, no cell-specific reference signal is transmitted in each subframe 300 by the radio network node 120.

The wireless communication system 100 may be based on an LTE system. The receiver 110 may be a User Equipment (UE). The radio network node 120 may be an evolved NodeB, eNodeB. The data channel may be a Physical Downlink Shared Channel (PDSCH). The control channel may be an Enhanced Physical Downlink Control Channel (EPDCCH).

The receiver 110 is configured to perform any, some or all of the actions 901-902 for receiving the broadcast information.

For enhanced clarity, any internal electronics or other components of the receiver 110, not completely indispensable for understanding the herein described embodiments has been omitted from FIG. 10.

The receiver 110 comprises a processing circuit 1020, configured for estimating channel state, to be utilised when communicating with the radio network node 120.

The processing circuit 1020 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The herein utilised expression "processing circuit" may thus represent a processing circuitry comprising a plurality of processing circuits, such as, e.g., any, some or all of the ones enumerated above.

The processing circuit 1020 may further perform data processing functions for inputting, outputting, and processing of data comprising data buffering and device control functions, such as call processing control, user interface control, or the like.

Also, the receiver 110 comprises a receiving unit 1010, configured for receiving broadcast information from the radio network node 120 on a set of antenna ports according to an estimated channel state.

Also, according to some embodiments, the receiver 110 may comprise a transmitting unit 1030, configured for transmitting radio signals.

Furthermore, the receiver 110 may comprise at least one memory 1025, according to some embodiments. The memory 1025 may comprise a physical device utilised to store data or programs, i.e., sequences of instructions, on a temporary or permanent basis. According to some embodiments, the memory 1025 may comprise integrated circuits comprising silicon-based transistors. Further, the memory 1025 may be volatile or non-volatile.

The actions 901-902 to be performed in the receiver 110 may be implemented through one or more processing circuits 1020 in the receiver 110, together with computer program code for performing the functions of the actions 901-902. Thus a computer program product, comprising instructions for performing the actions 901-902 in the receiver 110 may perform reception of broadcast information, over at least one antenna port, in a subframe 300 comprising a plurality of time-frequency resources, which broadcast information is transmitted by a radio network node 120 in a wireless communication system 100, wherein the set of time-frequency resources is exclusively associated with the set of antenna ports for transmission of the information entity and wherein no cell-specific reference signal is transmitted in each subframe 300 by the radio network node 120.

The computer program product mentioned above may be provided for instance in the form of a data carrier carrying computer program code for performing at least some of the actions 901-902 according to some embodiments when being loaded into the processing circuit 1020. The data carrier may be, e.g., a hard disk, a CD ROM disc, a memory stick, an optical storage device, a magnetic storage device or any other appropriate medium such as a disk or tape that may hold machine readable data in a non transitory manner. The computer program product may furthermore be provided as computer program code on a server and downloaded to the receiver 110 remotely, e.g., over an Internet or an intranet connection.

The terminology used in the detailed description of the invention as illustrated in the accompanying drawings is not intended to be limiting of the described methods 700, 900, radio network node 120 and receiver 110, which instead are limited by the enclosed claims.

As used herein, the term "and/or" comprises any and all combinations of one or more of the associated listed items. In addition, the singular forms "a", "an" and "the" are to be interpreted as "at least one", thus also comprising a plurality, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof.

The invention claimed is:

1. A method in a radio network node, for transmission of broadcast information, which is to be received by a receiver in a wireless communication system, transmitted over a set of antenna ports comprising at least one antenna port, in at least one subframe comprising a set of time-frequency resources, wherein a cell-specific reference signal, CRS, is not transmitted in the at least one subframe, the method comprising:
defining the set of antenna ports for the set of time-frequency resources,
transmitting the broadcast information on the defined set of antenna ports, thereby using the set of time-frequency resources exclusively, such that the set of time-frequency resources are unused for any other antenna port,
wherein a modulation sequence of the at least one antenna port is pre-determined and is a function of a physical layer cell ID obtainable from synchronization channels,
wherein the pre-determined modulation sequence is the same as a sequence used for certain instances of EPDCCH demodulation.

2. The method according to claim 1, wherein at least one of the set of time-frequency resources for reference symbols of the set of antenna ports coincide with at least one time-frequency resource defined for a Demodulation Reference Signal, DM-RS, which is defined for demodulation of data and/or control channels in a subframe comprising a broadcast information transmission.

3. The method according to claim 2, wherein the set of time-frequency resources for reference symbols of the set of antenna ports comprises the time-frequency resources defined by a DM-RS.

4. The method according to claim 2, wherein disjoint sets of time-frequency resources are used for reference symbols of the set of the defined antenna ports and the antenna ports comprising a DM-RS, for data and/or control channel transmission.

5. The method according to claim 2, wherein at least one antenna port used for transmitting the broadcast information is the same as at least one antenna port defined for transmission of a control channel in a common search space.

6. The method according to claim 2,
wherein a relation is defined between a number of layers used for transmission of the data channel and the antenna ports comprising a DM-RS, in a subframe comprising the antenna port for the broadcast information transmission, and
wherein the relation is applicable either to all time-frequency resources in the subframe, or to resource block pairs comprising the broadcast information transmission.

7. The method according to claim 6, wherein the relation between the number of layers used for transmission of the data channel and the antenna ports comprising a DM-RS is defined such that at least one number of layers used for transmission of the data channel is associated with an antenna port comprising a DM-RS is different from the antenna port with the number 6 added to the number of layers used for transmission of the data channel.

8. The method according to claim 7, wherein the number of layers used for transmission of the data channel is at least two.

9. The method according to claim 2, wherein the antenna port relation for downlink control channels in subframes comprising the broadcast information transmission is differentiated, either for all time-frequency resources in the subframe, or for the resource block pairs comprising the broadcast information transmission.

10. The method according to claim 1, wherein the set of antenna ports used for transmission of broadcast information in addition also are used for transmission of data and/or control information.

11. The method according to claim 9, wherein an additional set of antenna ports is defined for the control channel.

12. The method according to claim 1, wherein at least one of the time-frequency resources for reference symbols of the set of antenna ports for the broadcast information transmission coincide with at least one time-frequency resource being defined by a Common Reference Signal, CRS, in a resource block comprising the broadcast information transmission.

13. The method according to claim 12, wherein the time-frequency resources for reference symbols of the set of antenna ports for the broadcast information transmission is the same as the time-frequency resources for reference symbols of an antenna port comprising CRS, in at least a first and/or a second half of a subframe.

14. The method according to claim 12, wherein time-frequency resources for the reference symbols for antenna ports comprising CRS are reused and wherein the number of resource blocks comprising the reference symbols of different antenna ports in the set of antenna ports used for the broadcast information transmission is different, covering at least the resource blocks wherein the broadcast information transmission is made.

15. The method according to claim 14, wherein the number of time-frequency resources for the reference symbols of the set of antenna ports for the broadcast information transmission is different among resource blocks.

16. A radio network node, for transmission of broadcast information, which is to be received by a receiver in a wireless communication system, transmitted over a set of antenna ports comprising at least one antenna port, in at least one subframe comprising a set of time-frequency resources, wherein no cell-specific reference signal, CRS, is transmitted in each subframe, wherein the radio network node comprises:
a processor, configured for defining a set of antenna ports for the set of time-frequency resources; and
a transmitter, configured for transmitting the broadcast information on the defined set of antenna ports, thereby using the set of time-frequency resources exclusively, such that the set of time-frequency resources are unused for any other antenna port,
wherein a modulation sequence of the at least one antenna port is pre-determined and is a function of a physical layer cell ID,
wherein the pre-determined modulation sequence is the same as a sequence used for certain instances of EPDCCH demodulation obtainable from synchronization channels.

17. A non-transitory computer-readable medium storing a computer program in a radio network node, the computer program configured for performing the method for transmission of broadcast information to be received by a receiver, according to claim 1, when the computer program is executed by a processing circuit of the radio network node.

18. A method in a receiver, for reception of broadcast information, over at least one antenna port, in a subframe comprising a plurality of time-frequency resources, in which broadcast information is transmitted by a radio network node in a wireless communication system, wherein the set of time-frequency resources is exclusively associated with the set of antenna ports for transmission of the information entity and wherein no cell-specific reference signal is transmitted in each subframe by the radio network node, the method comprising:
    estimating channel state, to be utilized when communicating with the radio network node, and
    receiving broadcast information from the radio network node on a set of antenna ports according to the estimated channel state,
    wherein a modulation sequence of the at least one antenna port is pre-determined and is a function of a physical layer cell ID obtainable from synchronization channels,
    wherein the pre-determined modulation sequence is the same as a sequence used for certain instances of EPDCCH demodulation.

19. A receiver apparatus, configured for reception of broadcast information, over at least one antenna port, in a subframe comprising a plurality of time-frequency resources, in which broadcast information is transmitted by a radio network node in a wireless communication system, wherein the set of time-frequency resources is exclusively associated with the set of antenna ports for transmission of the information entity and wherein no cell-specific reference signal is transmitted in each subframe by the radio network node, wherein the receiver apparatus, comprises:
    a receiver, configured for receiving broadcast information from the radio network node on a set of antenna ports according to an estimated channel state; and
    a processor, configured for estimating channel state, to be utilized when communicating with the radio network node,
    wherein a modulation sequence of the at least one antenna port is pre-determined and is a function of a physical layer cell ID,
    wherein the pre-determined modulation sequence is the same as a sequence used for certain instances of EPDCCH demodulation obtainable from synchronization channels.

* * * * *